(12) United States Patent
Bahritdinov

(10) Patent No.: US 11,204,444 B2
(45) Date of Patent: Dec. 21, 2021

(54) QUANTUM DOT LIGHTNING DETECTION AND WARNING SYSTEM AND METHOD

(71) Applicant: Consolidated Nuclear Security, LLC, Oak Ridge, TN (US)

(72) Inventor: Farhod Bahritdinov, Amarillo, TX (US)

(73) Assignee: Consolidated Nuclear Security, LLC, Oak Ridge, TN (US)

(*) Notice: Subject to any disclaimer, the term of this patent is extended or adjusted under 35 U.S.C. 154(b) by 492 days.

(21) Appl. No.: 16/147,981

(22) Filed: Oct. 1, 2018

(65) Prior Publication Data

US 2020/0064516 A1 Feb. 27, 2020

Related U.S. Application Data

(60) Provisional application No. 62/722,232, filed on Aug. 24, 2018.

(51) Int. Cl.
| | |
|---|---|
| *G01W 1/16* | (2006.01) |
| *G01S 3/781* | (2006.01) |
| *G01S 5/16* | (2006.01) |
| *G08B 21/10* | (2006.01) |
| *G01S 3/78* | (2006.01) |
| *B82Y 15/00* | (2011.01) |

(52) U.S. Cl.
CPC ............... *G01W 1/16* (2013.01); *G01S 3/781* (2013.01); *G01S 3/7806* (2013.01); *G01S 5/16* (2013.01); *G01S 5/166* (2013.01); *G08B 21/10* (2013.01); *B82Y 15/00* (2013.01)

(58) Field of Classification Search
CPC .. G01W 1/16; G01S 3/781; G01S 5/16; G01S 5/166; G01S 3/7806; G01S 3/782; G08B 21/10; B82Y 15/00; B82Y 30/00
USPC ....................................................... 73/170.24
See application file for complete search history.

(56) References Cited

U.S. PATENT DOCUMENTS

| | | | |
|---|---|---|---|
| 5,771,020 A | 6/1998 | Markson et al. | |
| 6,803,719 B1 | 10/2004 | Miller et al. | |
| 6,828,911 B2 | 12/2004 | Jones et al. | |
| 9,151,668 B1* | 10/2015 | Nagarkar | G01T 1/16 |
| 9,535,169 B2* | 1/2017 | Uchida | G01T 1/1644 |
| 10,072,979 B2* | 9/2018 | Pearl, Jr. | G01N 21/85 |
| 2007/0221854 A1* | 9/2007 | Shirakawa | G01T 1/20 250/367 |

(Continued)

OTHER PUBLICATIONS

Mario Urdaneia, Quantum Dot Composite Radiation Detectors, Weinberg Medical Physics LLC 2Wayne State University USA. Chapter • Jul. 2011.

(Continued)

*Primary Examiner* — Nathaniel T Woodward
(74) *Attorney, Agent, or Firm* — Clements Bernard Walker; Christopher L. Bernard; Christine W. Beninati

(57) ABSTRACT

A quantum dot (QD) lightning detection and warning (LDW) system and method. This LDW system and method find broader applicability to spark and other transient optical event detection as well. The QDs are operable for receiving ultraviolet (UV), infrared (IR), visible, x-ray, and/or gamma ray radiation emanating from lightning or the like and generating visible radiation that may be detected and utilized to generate topological event information, such that property, human life, and the like may be safeguarded.

23 Claims, 3 Drawing Sheets

(56) References Cited

U.S. PATENT DOCUMENTS

2016/0258807 A1* 9/2016 Pein .................. G01J 5/046

OTHER PUBLICATIONS

Deng-Yang Guo, Highly Sensitive Ultraviolet Photodetectors Fabricated from ZnO Quantum Dots/Carbon Nanodots Hybrid Films, 1State Key Laboratory of Luminescence and Applications, Changchun Institute of Optics, Fine Mechanics and Physics, Chinese Academy of Sciences, Changchun 130033, China, 2University of Chinese Academy of Sciences, Beijing 10049, China.

Xiaoyong Xu, High-performance deep ultraviolet photodetectors based on ZnO quantum dot assemblies, Journal of Applied Physics 116, 103105 (2014).

Liu, Du et al. "Visible light photoelectrochemical sensor for ultrasensitive determination of dopamine based on synergistic effect of graphene quantum dots and TiO2 nanoparticles" 2015.

* cited by examiner

QUANTUM DOT LIGHTNING DETECTION AND WARNING SYSTEM AND METHOD

CROSS-REFERENCE TO RELATED APPLICATION

The present patent application/patent claims the benefit of priority of U.S. Provisional Patent Application No. 62/722,232, filed on Aug. 24, 2018, and entitled "QUANTUM DOT LIGHTNING DETECTION AND WARNING SYSTEM AND METHOD," the contents of which are incorporated in full by reference herein.

STATEMENT REGARDING GOVERNMENT RIGHTS

The U.S. Government has certain rights to the present disclosure pursuant to Contract No. DE-NA0001942 between the U.S. Department of Energy and Consolidated Nuclear Security, LLC.

FIELD OF THE DISCLOSURE

The present disclosure relates generally to a quantum dot (QD) lightning detection and warning (LDW) system and method. This LDW system and method finds broader applicability to explosion, fire, spark, and other transient optical event detection as well. The QDs are operable for receiving ultraviolet (UV), infrared (IR), visible, x-ray, and/or gamma ray radiation emanating from lightning or the like and generating visible radiation that may be detected and utilized to generate topological event information, such that property, human life, and the like may be safeguarded.

BACKGROUND OF THE DISCLOSURE

LDW systems and methods are widely used to generate topological event information such that property, human life, and the like may be safeguarded. For example, it is important for plants manufacturing or utilizing combustible materials to understand the historical and present lightning frequency conditions in their area, such that threat mitigation equipment and measures may be put in place and implemented. Most of the conventional LDW systems and methods utilize optical image, radio-frequency (RF) energy, or static electricity cameras or detectors and a variety of associated geolocation algorithms, often coupled with radar data or the like.

For example, U.S. Pat. No. 5,771,020 provides a lightning detection system for detecting and locating an initial discharge of an initial leader stroke of a lightning flash. An initial lightning discharge produces a pulse that can be used to accurately detect lightning, and more particularly, the location of the initial lightning discharge. In one embodiment, at least three sensors detect and determine the location of the first pulses from initial lightning discharges using time difference of arrival information of the pulses at each of the three sensors. In another embodiment, a single sensor is used to determine the range of an initial lightning discharge from the amplitude of a corresponding initial detected pulse, and to determine its direction from a crossed loop antenna. An alternative embodiment of a single sensor system determines a distance of a lightning event from a peak amplitude value derived from a pulse amplitude distribution. In a further embodiment, a lightning detection system provides enhanced lightning location by incorporating weather data from a weather radar with detected lightning information.

U.S. Pat. No. 6,828,911 provides a system and method for detecting and predicting lightning strikes via specialized electrostatic detection using highly sensitive atmospheric static electric detection, interpretation, and alarm signal distribution. The system employs a detection means which includes a designated lightning sensor having a surface which carries a high impedance static voltage reference charge. This reference charge, called the pilot voltage, is a static charge delivered to the lightning sensor at very low currents. The pilot voltage influences the relative charge in the molecules found in the atmosphere immediately surrounding the lightning sensor. There is a gradual transition in the charge between the lightning sensor's surface and the molecules in the atmosphere that surrounds the sensor. It is this varying molecular state that creates a modulation process which the invention uses to determine a lightning strike.

Such conventional LDW systems and methods lack sufficient accuracy and responsiveness and/or fail to operate adequately in both near-field (i.e., within a few miles) and far-field (i.e., within tens or hundreds of miles) applications. Thus, inadequate lightning location and frequency data is provided. For example, the Lightning Mapping Array (LMA) developed by the Kennedy Space Center determines the three-dimensional (3-D) structure of a storm and predicts potential lightning within 100 km between 5 and 60 minutes in advance. However, the system utilizes time-of-arrival measurements from ten receivers to locate impulsive very-high-frequency (VHF) radiation events. The Jupiter Optical Lightning Surveillance (JOLS) system developed by Scientific Lightning Solutions, LLC uses high-speed cameras and produces global positioning system (GPS)/time-tagged lightning strike images to identify which facilities and/or assets should be checked for potential lightning damage after-the-fact on a site-specific basis. The system is solar powered.

Instructively, QDs are small (i.e., nanometer-scale) colloidal semiconductor crystals, well known to those of ordinary skill in the art, that are capable of receiving UV, IR, visible, x-ray, and/or gamma ray radiation and generating visible radiation via photoluminescence. QDs may be suspended in a host matrix (liquid or semi-solid) and/or deposited on a solid substrate and have been used in many varied applications, including, transistors, solar cells, light-emitting diode (LED) displays, diode lasers, power supplies, quantum computers, and medical imaging systems. QDs may include III-V semiconductors, derived from elements from groups III (boron, aluminum, gallium, indium) and V (nitrogen, phosphorus, arsenic, antimony, bismuth), II-VI semiconductors, derived from elements from group II (zinc, cadmium) and VI (oxygen, sulfur, selenium, tellurium), and silicon. QDs have optical and photonic properties, emission bandwidths, and photoluminescence intensities that are dependent upon both material and size. QDs have unique characteristics due to pronounced quantization effects and the discrete density states of the quasi-zero-dimensional structures. The artificial atom-like structures exhibit shell behavior and the occupation of these shells follows Pauli's Exclusion Principle.

For example, U.S. Pat. No. 6,803,719 provides a light-emitting device comprising a population of QDs embedded in a host matrix and a primary light source which causes the QDs to emit secondary light and method of making such a device. The size distribution of the QDs is chosen to allow light of a particular color to be emitted therefrom. The light emitted from the device may be of either a pure (i.e., monochromatic) color, or a mixed (i.e., polychromatic) color, and may consist solely of light emitted from the QDs themselves, or of a mixture of light emitted from the QDs and light emitted from the primary source. The QDs desirably are composed of an undoped semiconductor, such as CdSe, and may optionally be overcoated to increase photoluminescence.

QDs have been used as both photodetectors and photoemitters conventionally. For example, U.S. Pat. No. 9,151,668 provides scintillators and related devices and methods. More specifically, the invention provides quantum dot scintillators for use, for example, in radiation detection, including gamma ray spectroscopy, and x-ray and neutron detection.

What are still needed, however, are LDW systems and methods that are operable for receiving UV, IR, visible, x-ray, and/or gamma ray radiation emanating from lightning or the like and generating visible radiation that may be detected and utilized to generate topological event information, such that property, human life, and the like may be safeguarded. Such LDW systems and methods may utilize QDs.

BRIEF SUMMARY OF THE DISCLOSURE

In various exemplary embodiments, the present disclosure relates to a QD LDW system and method. This LDW system and method finds broader applicability to explosion, fire, spark and other transient optical event detection as well. The QDs are operable for receiving UV, IR, visible, x-ray, and/or gamma ray radiation emanating from lightning or the like and generating visible radiation that may be detected and utilized to generate topological event information, such that property, human life, and the like may be safeguarded. For example, in the context of lightning detection, UV and visible radiation from the lightning initiates the photoluminescence of visible light of one or more given wavelengths from the QDs associated with one or more given detectors. Related to each detector, the QDs are suspended in a suitable liquid or semi-solid matrix or deposited on a suitable solid substrate and packaged in a suitable environmentally-hardened cartridge, which may be grouped with other cartridges in a suitable environmentally-hardened housing, for example. Spaced arrays and networks of these detectors, cartridges, and/or housings can then be set up over dispersed geographical areas to obtain triangulation and time-of-flight data related to the lightning. The detectors, cartridges, and/or housings may also be directionally biased, such that comprehensive geographical coverage is provided. Alternatively, radiation may be funneled to one or more detectors via a thin slit, such that wavelength content and directionality of the lightning may be selectively assessed—forming a sort of "pinhole" camera for the lightning. The QDs of the present disclosure provide a cost-effective optical detector with high speed, accuracy, and reliability, allowing for the cost-effective topology and history generation of lightning and other transient optical events. Gamma events can also be detected and mapped in a similar manner.

In one exemplary embodiment, the present disclosure provides a system operable for detecting a transient radiation emission event, including: a plurality of sensor devices, wherein each of the plurality of sensor devices includes one or more quantum dot devices operable for receiving incident radiation from the transient radiation event and generating visible photoluminescence radiation and one or more photodetector devices optically coupled to the one or more quantum dot devices operable for detecting the visible photoluminescence radiation from the one or more quantum dot devices and generating one or more output signals; and a communications link operable for transmitting output signals from the plurality of sensor devices to a central aggregation processor operable for determining a direction, location, and time of the transient radiation emission event using the output signals; wherein the plurality of sensors are geographically dispersed. The incident radiation includes one or more of ultraviolet (UV) radiation, infrared (IR) radiation, visible radiation, x-ray radiation, and gamma ray radiation. The one or more quantum dot devices are one or more of suspended in a liquid matrix, suspended in a semi-solid matrix, and deposited on a solid substrate. Optionally, the one or more quantum dot devices are one of arranged in a thin slit pattern and covered by a thin slit mask. Each of the plurality of sensor devices further includes signal amplification and transformation hardware coupled to the one or more photodetector devices operable for amplifying and transforming the one or more output signals generated by the one or more photodetector devices. Optionally, each of the plurality of sensor devices includes a housing partially or wholly disposed around the one or more photodetector devices. The plurality of sensor devices are arranged in a local array. The local array is arranged in a geographical network with other local arrays. The central aggregation processor is operable for executing one or more of a triangulation algorithm and a time-of-flight algorithm to determine the direction, location, and time of the transient radiation emission event.

In another exemplary embodiment, the present disclosure provides a method for detecting a transient radiation emission event, including: providing a plurality of sensor devices, wherein each of the plurality of sensor devices includes one or more quantum dot devices operable for receiving incident radiation from the transient radiation event and generating visible photoluminescence radiation and one or more photodetector devices optically coupled to the one or more quantum dot devices operable for detecting the visible photoluminescence radiation from the one or more quantum dot devices and generating one or more output signals; and providing a communications link operable for transmitting output signals from the plurality of sensor devices to a central aggregation processor operable for determining a direction, location, and time of the transient radiation emission event using the output signals; wherein the plurality of sensors are geographically dispersed. The incident radiation includes one or more of ultraviolet (UV) radiation, infrared (IR) radiation, visible radiation, x-ray radiation, and gamma ray radiation. The one or more quantum dot devices are one or more of suspended in a liquid matrix, suspended in a semi-solid matrix, and deposited on a solid substrate. Optionally, the one or more quantum dot devices are one of arranged in a thin slit pattern and covered by a thin slit mask. Each of the plurality of sensor devices further includes signal amplification and transformation hardware coupled to the one or more photodetector devices operable for amplifying and transforming the one or more output signals generated by the one or more photodetector devices. Optionally, each of the plurality of sensor devices includes a housing partially or wholly disposed around the one or more photodetector devices. The plurality of sensor devices are arranged in a local array. The local array is arranged in a geographical network with other local arrays. The central aggregation processor is operable for executing one or more of a triangulation algorithm and a time-of-flight algorithm to determine the direction, location, and time of the transient radiation emission event.

In a further exemplary embodiment, the present disclosure provides a sensor device operable for detecting a transient radiation emission event, including: one or more quantum dot devices operable for receiving incident radiation from the transient radiation event and generating visible photoluminescence radiation; one or more photodetector devices optically coupled to the one or more quantum dot devices operable for detecting the visible photoluminescence radiation from the one or more quantum dot devices and generating one or more output signals; signal amplification and transformation hardware coupled to the one or more photodetector devices operable for amplifying and transforming the one or more output signals generated by the one or more photodetector devices; and a communications link operable for transmitting an output signal from the sensor device to a central aggregation processor operable for determining a direction, location, and time of the transient radiation emission event using the output signal. The incident radiation includes one or more of ultraviolet (UV) radiation, infrared (IR) radiation, visible radiation, x-ray radiation, and gamma ray radiation. The one or more quantum dot devices are one or more of suspended in a liquid matrix, suspended in a semi-solid matrix, and deposited on a solid substrate. Optionally, the one or more quantum dot devices are one of arranged in a thin slit pattern and covered by a thin slit mask. Optionally, the sensor device further includes a housing partially or wholly disposed around one or more of the one or more photodetector devices, the signal amplification and transformation hardware, and the communications link. The central aggregation processor is operable for executing one or more of a triangulation algorithm and a time-of-flight algorithm to determine the direction, location, and time of the transient radiation emission event.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to a QD LDW system and method. This LDW system and method finds broader applicability to explosion, fire, spark, and other transient optical event detection as well. The QDs are operable for receiving UV, IR, visible, x-ray, and/or gamma ray radiation emanating from lightning or the like and generating visible radiation that may be detected and utilized to generate topological event information, such that property, human life, and the like may be safeguarded. For example, in the context of lightning detection, UV and visible radiation from the lightning initiates the photoluminescence of visible light of one or more given wavelengths from the QDs associated with one or more given detectors. Related to each detector, the QDs are suspended in a suitable liquid or semi-solid matrix or deposited on a suitable solid substrate and packaged in a suitable environmentally-hardened cartridge, which may be grouped with other cartridges in a suitable environmentally-hardened housing, for example. Spaced arrays and networks of these detectors, cartridges, and/or housings can then be set up over dispersed geographical areas to obtain triangulation and time-of-flight data related to the lightning. The detectors, cartridges, and/or housings may also be directionally biased, such that comprehensive geographical coverage is provided. Alternatively, radiation may be funneled to one or more detectors via a thin slit, such that wavelength content and directionality of the lightning may be selectively assessed—forming a sort of "pinhole" camera for the lightning. The QDs of the present disclosure provide a cost-effective optical detector with high speed, accuracy, and reliability, allowing for the cost-effective topology and history generation of lightning and other transient optical events. Gamma events can also be detected and mapped in a similar manner.

Figure 1:
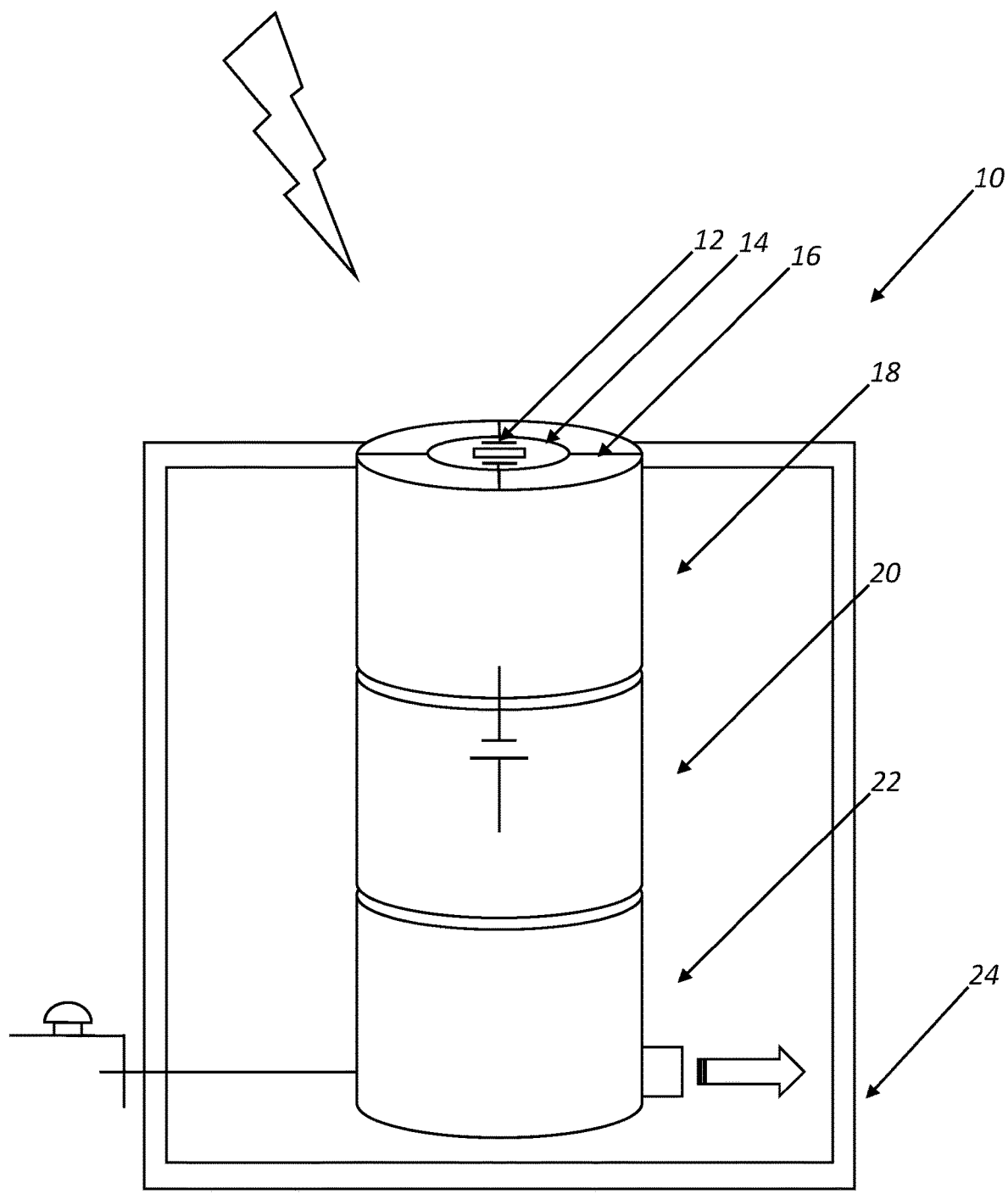
FIG. 1 is a schematic diagram illustrating one exemplary embodiment of the LDW sensor of the present disclosure.

Referring now specifically to FIG. 1, in one exemplary embodiment, the sensor device 10 of the present disclosure includes one or more QDs 12 that are suspended in a liquid or semisolid matrix 14 and/or deposited on a solid substrate 16 using methodologies well known to those of ordinary skill in the art. The one or more QDs 12 are optically coupled to one or more suitable photodetectors 18, such that, when the one or more QDs 12 receive incident radiation (e.g., from lightning, a transient optical event, or the like), the visible radiation emitted by the one or more QDs 12 is detected by the one or more photodetectors 18, thereby converting the optical input signal to an optical or electrical output signal. Again, the incident radiation may be UV, IR, visible, x-ray, and/or gamma ray radiation. The one or more photodetectors 18 may be photodiodes, photomultipliers, and/or the like, well known to those of ordinary skill in the art. The responsiveness of this detector setup may be on the order of picoseconds to nanoseconds, with the QDs 12 generally providing $10^{-12}$ sec responsiveness and the photodetectors 18 generally providing $10^{-10}$ sec responsiveness. The one or more photodetectors 18 are coupled to appropriate signal amplification and transformation hardware 20 for converting current to voltage, for example. These components are well known to those of ordinary skill in the art. Finally, the signal amplification and transformation hardware 20 is coupled to appropriate communications hardware 22, such as a RF link, a Wi-Fi link, a hardwire network link, etc. Thus, the output of the sensor device 10 is coupled to appropriate data aggregation and processing hardware. In this exemplary embodiment, the components are arranged in a stacked cylindrical configuration, although other configurations could be used equally. For example, all components could be coupled to an appropriate circuit board or the like. Quality control and periodic quality checks can be performed with respect to the QDs 12 using analytical electron microscopy (AEM), transmission electron microscopy (TEM), high-resolution transmission electron microscopy (HRTEM), etc. This non-destructively provides an elemental composition analysis of the QDs 12, which are very durable and provide extended operational functionality.

For stationary applications, the sensor devices 10 are arranged in any desirable geometric array that provides adequate geographical coverage and visibility. Such an array of sensor devices 10 allows one to register signals generated almost immediately following a lightning event, for example, near a given location thanks to capturing the radiation on all facing sides of the sensor devices 10 of the array. This allows the system to determine the exact location of the lightning using the azimuthal angle and trigonometric functions. Such triangulation methodologies are well known to those of ordinary skill in the art. The QDs 12 each have a unique digital address in the matrix and/or array. These addresses are registered to determine and record the location of the lightning event. For the efficient application of the sensor devices 10, a time-of-flight method can of course be used. This assists in determining the direction and exact location of the lightning. The array or network of arrays may have any necessary scale, depending on the user's needs for registering the topology of lightning and storm velocity (both speed and direction). These aspects are described in greater detail herein below.

For durability purposes, the sensor devices 10 may be partially or wholly disposed in one or more environmentally-hardened cartridges and/or housings 24. Any suitable physical arrangements may be utilized.

Advantageously, the QDs 12 relax to an initial state after emitting colored light and do not wear out. Hence, the QDs 12 may remain functional for decades. They require very little maintenance intervention.

Spectral studies of ZnO QDs have been conducted in the development of LEDs, photovoltaics, displays, and bio-imaging systems. The ZnO was stabilized in water and excitonic peak absorption at 340 nm (3.64 eV) was observed. Emission in the form of photoluminescence was observed in the range of the visible spectrum (400-700 nm). Higher intensity was achieved by treating the ZnO nanocrystals with glutathione (GSH). General inquiry renders the optical absorption data for ZnO QDs in the spectrum of 200-450 nm. The emission spectrum varies as white, or as any color of visible light. The lifetime of fluorescence increases when the particles get larger. The fluorescence decay time is on the scale of picoseconds ($10^{-12}$ sec). In experiments conducted, the tested samples were in the form of particle film deposition on an amorphous glass substrate.

Another well-researched QD compound is InP-based semiconductor nanocrystals, which are apparently non-toxic as nanoprobes in biomedical imaging applications. An apparent data point for absorption is 370 nm. The data related to emission (photoluminescence) by InP varies from 540 nm to 700 nm and depends on core particle size and ZnS and ZnSe shell etching. 1100 nm near-IR emission was also reportedly achieved using Cu-doped InP/ZnSe QDs.

Likewise, PbSe QDs have been used in night-vision devices (NVDs), which convert IR and near-IR light to visible light.

Table 1 provides a non-exhaustive list of the QD compounds and their absorption and emission spectra. Any suitable QD compound, including these or others, may be used in conjunction with the present disclosure.

TABLE 1

Exemplary QD Compounds

| Compound | Absorption | Emission |
| --- | --- | --- |
| CdSe | UV, 190-300 nm | 432-480 nm |
| ZnS | UV, 190-300 nm | 432-480 nm |
| ZnO | 210-390 nm | 340-720 nm |
| InP | Optical Transition Energy Near IR | 540-700 nm |
| Cu:InP/ZnSe | UV and Visible | Near-IR, 1100 nm |
| InP/ZnS | 370 nm | 530-650 nm, 600-700 nm, 500-655 nm (in PEG) |
| PbS | UV | 1000-1600 nm |

The present disclosure assumes the potential use of all forms and material compositions as long as the QDs are suitable for use for either ionizing or non-ionizing radiation detection. The present disclosure also allows for all manners of placement of the QDs (in surfactants, in multi-layered composites, as carbon nanotube sub-layers, in thin films, etc.), as long as QDs are suitable for use for either ionizing or non-ionizing radiation detection.

High-precision detection using a time-of-flight methodology allows one to record the origin of a photon using triangulation, well known to those of ordinary skill in the art. Taking into consideration the picosecond-scale responsiveness of the QDs 12, the scale of the detection speed of the QD sensors 10 is 30 cm/ns, since light travels 0.03 cm in a picosecond. Since an average city block is 270-300 m, 500 ns is a meaningful time for the time-of-flight arrangement in such a geographical context. Even if operating in a microsecond range, the resolution would still be 30,000 cm. Thus, advantageous operational responsiveness and accuracy is provided. Using solid-state-deposited QDs 12 obviates the need for the use of photomultipliers in some cases. The use of solid-state integrated QDs 12 provides safety of the sensors/detectors 10, as well as high-efficiency photon detection and signaling. Preferably, the array utilized transmits time stamps and all clocks used in the system are intermittently synchronized.

Figure 2:
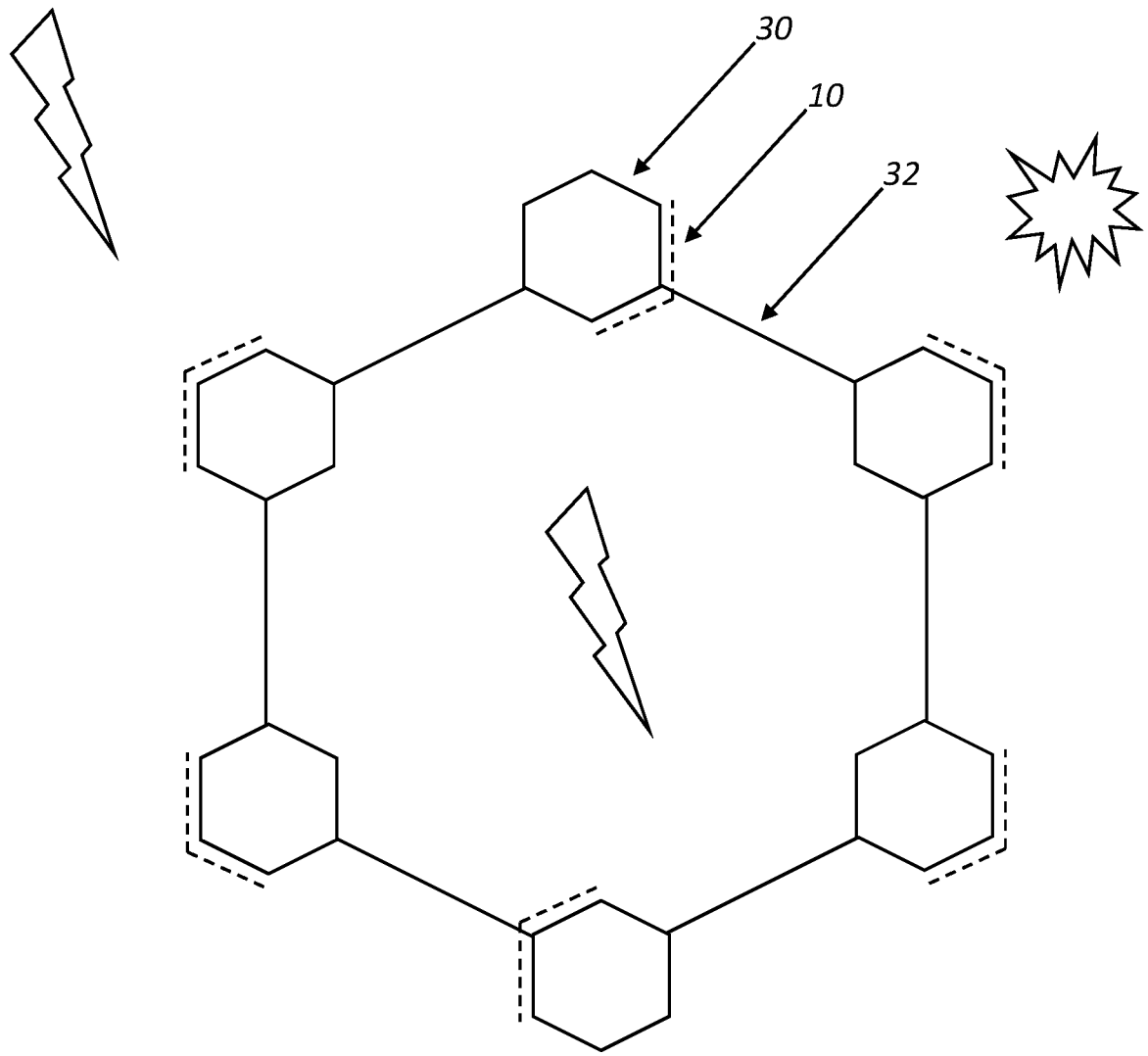
FIG. 2 is a schematic diagram illustrating one exemplary embodiment of a network incorporating a plurality of arrays of the LDW sensor of FIG. 1.

Referring now specifically to FIG. 2, in one exemplary embodiment, the QD sensors 10 are arranged in hexagonal local arrays 30, which are, in turn, arranged in a hexagonal network 32. All local arrays 30 of the network 32 are preferably in communication with a central data collection and processing system (not illustrated). The most accurate arrangement of the local array 30 would be a circular or spherical one with no gaps, covering all directions with QD sensors 10, with a triangular arrangement, for example, being more efficient but less accurate. Hexagons and other intermediate shapes thus provide a good mix of accuracy and efficiency. Different arrays can have different directionalities, thus covering large areas within and outside of the network 32. The network 32 can thus provide topological data over miles, tens of miles, or even hundreds of miles over the life of a storm or the span of years. Preferably, the QD sensors 10 are disposed as close to the ground as possible. Further, distant sources can be detected with the mutually proximate surfaces and regions of the array due to maximum wave intensities and constructive interference of the light waves. In turn, the proximate sources will cover the majority of the facing detecting surfaces of the array.

Figure 3:
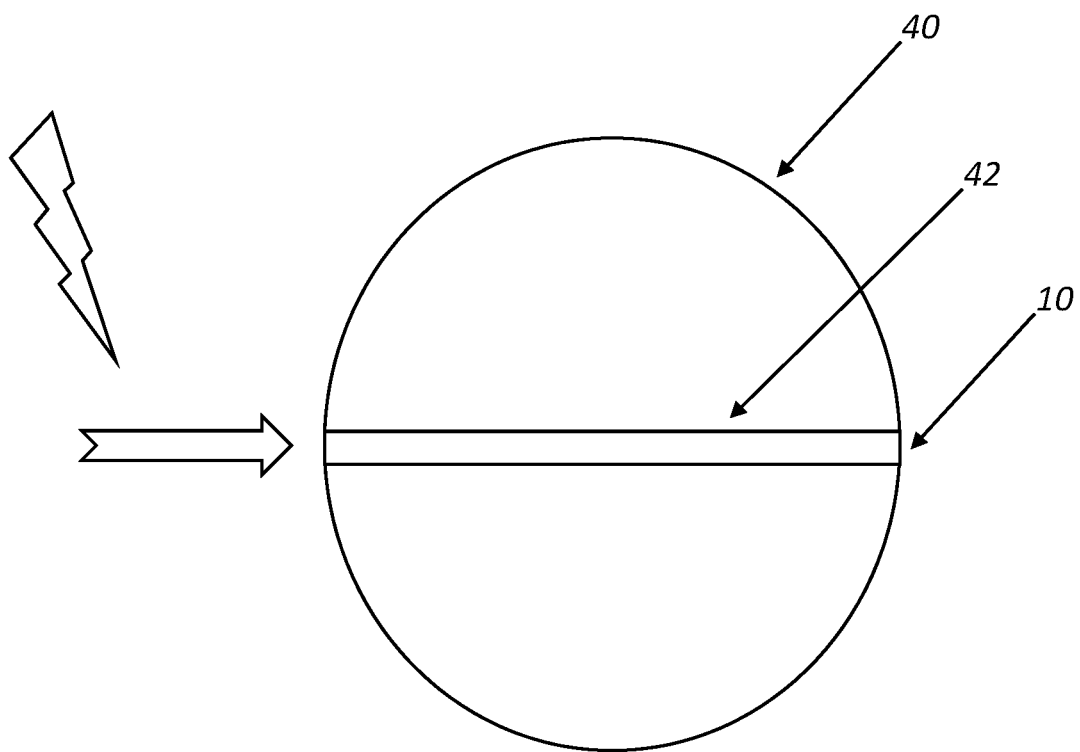
FIG. 3 is a schematic diagram illustrating one exemplary embodiment of a wavelength/direction discriminating slit detector, cartridge, or housing that may be used in conjunction with the LDW sensor of FIG. 1.

Referring now specifically to FIG. 3, in another exemplary embodiment, the QD sensor 10 may effectively be formed and utilized as a single-horizon sensor via a wavelength/direction discriminating structure 40 incorporating a thin slit 42 of QD sensors 10 or a QD sensor 10 that is masked but for a thin slit 42. Here the active photodetection area is directionally oriented and effectively filters out non-selected wavelengths. Accordingly, QDs 10 can be grown in the Stranski-Krastanov mode, well known to those of ordinary skill in the art. For some industrial applications, higher precision and accuracy are necessary, especially if the ranges of photon sources are greater. To achieve such precision and accuracy, several (e.g., two to four) thin-slit devices could be utilized with 180° openings. In the case of a low-budget or residential application, one device may be used with a 360° opening along the circumference or horizontal dimension of the device. The semi-circular (i.e., 180°) opening would also prevent detection of extra light from the effect of bending waves. FIG. 3 illustrates a sphere, but different embodiments can have different geometric forms, but the sphere would be the most resistive to the elements/natural phenomena (wind, water, snow, heat dissipation, etc.).

Preferably, the data software applications/algorithms of the present disclosure are implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory, to communicate data to and from the memory, and to generally control operations pursuant to the coded instructions. In an exemplary embodiment, the processor may include a mobile optimized processor, such as one optimized for power consumption and mobile applications. Input/output (I/O) interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a graphical user interface (GUI) that enables the user to interact with the memory. Additionally, the I/O interfaces may further include an imaging device, e.g., the camera, a video camera, etc.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionalities.

Thus, the present disclosure utilizes QD technology for lightning detection and the like due to the high-sensitivity and quick response time of the QDs. The QDs are arranged in a point-triggering array that registers time of arrival of a transient optical event, assisting in detection triangulation. The QDs have a bandgap that is tunable to a desired range for higher sensitivity. The QDs have a high enough sensitivity that they may be used for single-horizon implementations in a very thin slit arrangement, for example. Fast decay of the photoluminescent emission of the QDs, on a scale of picoseconds, allows for the effective registering of a multitude of lightning pulses and allows for the discrimination of lightning pulses from other emitting sources.

Importantly, the present disclosure provides for the application of QDs primarily for photon receiving, and not photon emitting (other than for activation detection). These QDs themselves need no power supply.

As alluded herein above, the systems and methods of the present disclosure may be used to detect any transient optical or gamma events, including lightning, explosions, fires, sparks, and the like. The QDs utilized are operable for receiving UV, IR, visible, x-ray, and/or gamma ray radiation emanating from such transient optical or gamma events and generating visible radiation that may be detected and utilized to generate topological event information, such that property, human life, and the like may be safeguarded.

The entities and groups that could benefit include the public, private enterprises, the US Government, the aviation and airline industries, the shipping industry, commercial drone operators, etc. For example, the National Lightning Detection Network (NLDN) can be enhanced with this technology. The US Navy and cargo/tanker and passenger shippers can place the technology aboard vessels and buoys. The technology may be used to safeguard military and commercial aircraft, drones, and spacecraft. It may be used by oil drillers and refiners, farmers, and the like. The UV absorption capability of the QDs of the present disclosure enables enhanced fire detection and warning—mitigating residential, commercial, storage facility, forest, and other fires. Similarly, since the necessary time of detection of the inadvertent escape of x-rays is in the range of seconds, the QDs of the present disclosure would be useful to detect the inadvertent escape of such radiation on the scale of picoseconds or faster. Thus, research linear accelerators and synchrotron facilities, as well as medical and other x-ray users, may benefit from the use of these safety devices. With recent space exploration efforts obtaining and processing new images from the satellites, one of the new discoveries are Fermi Bubbles—low-energy gamma-ray regions above and below our galaxy. The QDs of the present disclosure, in their various assemblies and placements, may be capable of assisting in the mapping of such phenomena and others.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A system operable for detecting a transient radiation emission event, comprising:
   a plurality of sensor devices, wherein each of the plurality of sensor devices comprises one or more quantum dot devices operable for receiving incident radiation from the transient radiation event and generating visible photoluminescence radiation and one or more photodetector devices optically coupled to the one or more quantum dot devices operable for detecting the visible photoluminescence radiation from the one or more quantum dot devices and generating one or more output signals; and
   a communications link operable for transmitting output signals from the plurality of sensor devices to a central aggregation processor operable for determining a direction, location, and time of the transient radiation emission event using the output signals;

wherein the plurality of sensor devices are geographically spaced apart with a gap therebetween and arranged in a local geometric shaped array, wherein the local geometric shaped array comprises local groupings of multiple quantum dot devices or quantum dot cartridges; and wherein the local geometric shaped array of the plurality of sensor devices is arranged in a larger geometric shaped geographical network array with and geographically spaced apart from, leaving a gap therebetween other local geometric shaped arrays of the plurality of sensor devices.

2. The system of claim 1, wherein the incident radiation comprises one or more of ultraviolet (UV) radiation, infrared (IR) radiation, visible radiation, x-ray radiation, and gamma ray radiation.

3. The system of claim 1, wherein the one or more quantum dot devices are one or more of suspended in a liquid matrix, suspended in a semi-solid matrix, and deposited on a solid substrate.

4. The system of claim 1, wherein the one or more quantum dot devices are in a thin slit pattern and covered by a thin slit mask.

5. The system of claim 1, wherein each of the plurality of sensor devices further comprises signal amplification and transformation hardware coupled to the one or more photodetector devices operable for amplifying and transforming the one or more output signals generated by the one or more photodetector devices.

6. The system of claim 1, wherein the central aggregation processor is operable for executing one or more of a triangulation algorithm and a time-of-flight algorithm to determine the direction, location, and time of the transient radiation emission event.

7. The system of claim 1, wherein the local geometric shaped array is a hexagonal array and the geometric shaped geographical network is a hexagonal geographical network.

8. The system of claim 1, wherein the local geometric shaped array comprises the local groupings of multiple quantum dot devices or cartridges disposed in a common housing.

9. A method for detecting a transient radiation emission event, comprising:

providing a plurality of sensor devices, wherein each of the plurality of sensor devices comprises one or more quantum dot devices operable for receiving incident radiation from the transient radiation event and generating visible photoluminescence radiation and one or more photodetector devices optically coupled to the one or more quantum dot devices operable for detecting the visible photoluminescence radiation from the one or more quantum dot devices and generating one or more output signals; and providing a communications link operable for transmitting output signals from the plurality of sensor devices to a central aggregation processor operable for determining a direction, location, and time of the transient radiation emission event using the output signals;

wherein the plurality of sensor devices are geographically spaced apart with a gap therebetween and arranged in a local geometric shaped array, wherein the local geometric shaped array comprises local groupings of multiple quantum dot devices or quantum dot cartridges; and wherein the local geometric shaped array of the plurality of sensor devices is arranged in a larger geometric shaped geographical network with and geographically spaced apart from, leaving a gap therebetween other local geometric shaped arrays of the plurality of sensor devices.

10. The method of claim 9, wherein the incident radiation comprises one or more of ultraviolet (UV) radiation, infrared (IR) radiation, visible radiation, x-ray radiation, and gamma ray radiation.

11. The method of claim 9, wherein the one or more quantum dot devices are one or more of suspended in a liquid matrix, suspended in a semi-solid matrix, and deposited on a solid substrate.

12. The method of claim 9, wherein the one or more quantum dot devices are in a thin slit pattern and covered by a thin slit mask.

13. The method of claim 9, wherein each of the plurality of sensor devices further comprises signal amplification and transformation hardware coupled to the one or more photodetector devices operable for amplifying and transforming the one or more output signals generated by the one or more photodetector devices.

14. The method of claim 9, wherein the central aggregation processor is operable for executing one or more of a triangulation algorithm and a time-of-flight algorithm to determine the direction, location, and time of the transient radiation emission event.

15. The method of claim 9, wherein the local geometric shaped array is a hexagonal array and the geometric shaped geographical network is a hexagonal geographical network.

16. The method of claim 9, wherein the local geometric shaped array comprises the local groupings of multiple quantum dot devices or cartridges disposed in a common housing.

17. A sensor device operable for detecting a transient radiation emission event, comprising:

one or more quantum dot devices operable for receiving incident radiation from the transient radiation event and generating visible photoluminescence radiation;

one or more photodetector devices optically coupled to the one or more quantum dot devices operable for detecting the visible photoluminescence radiation from the one or more quantum dot devices and generating one or more output signals;

signal amplification and transformation hardware coupled to the one or more photodetector devices operable for amplifying and transforming the one or more output signals generated by the one or more photodetector devices; and a communications link operable for transmitting an output signal from the sensor device to a central aggregation processor operable for determining a direction, location, and time of the transient radiation emission event using the output signal;

wherein the sensor device is geographically spaced apart from and arranged in a local geometric shaped array of other sensor devices with a gap therebetween, wherein the local geometric shaped array comprises local groupings of multiple quantum dot devices or cartridges; and wherein the local geometric shaped array is arranged in a larger, geometric shaped geographical network array with and geographically spaced apart from, leaving a gap therebetween other local geometric shaped arrays.

18. The sensor device of claim 17, wherein the incident radiation comprises one or more of ultraviolet (UV) radiation, infrared (IR) radiation, visible radiation, x-ray radiation, and gamma ray radiation.

19. The sensor device of claim 17, wherein the one or more quantum dot devices are one or more of suspended in a liquid matrix, suspended in a semi-solid matrix, and deposited on a solid substrate.

20. The sensor device of claim 17, wherein the one or more quantum dot devices are in a thin slit pattern and covered by a thin slit mask.

21. The sensor device of claim 17, wherein the central aggregation processor is operable for executing one or more of a triangulation algorithm and a time-of-flight algorithm to determine the direction, location, and time of the transient radiation emission event.

22. The sensor device of claim 17, wherein the local geometric shaped array is a hexagonal array and the geometric shaped geographical network is a hexagonal geographical network.

23. The sensor device of claim 17, wherein the local geometric shaped array comprises the local groupings of multiple quantum dot devices or cartridges disposed in a common housing.

* * * * *